3,591,641
PRODUCTION OF DIALKYL ETHERS OF
POLYALKYLENE GLYCOLS
Jameil Ameen and Charlie A. Horner, Jr., Hopewell, and
Floyd A. Harrison, Colonial Heights, Va., assignors to
Allied Chemical Corporation, New York, N.Y.
No Drawing. Filed Oct. 28, 1968, Ser. No. 771,326
Int. Cl. C07c 41/04
U.S. Cl. 260—615     6 Claims

ABSTRACT OF THE DISCLOSURE

In the production of dialkyl ethers of polyalkylene glycols by forming the sodium alcoholate of the monoalkyl ether and reacting the sodium alcoholate with an alkyl chloride, incorporation of a small amount of water in the reaction medium facilitates separation of the sodium chloride by-product. The need for a sodium dispersing agent such as toluene is avoided by the incorporation of water.

BACKGROUND OF THE INVENTION

This invention relates to a proces for the production of dialkyl ethers of polyalkylene glycols from the monoalkyl ethers thereof; in particular, it relates to the incorporation of water in the reaction medium to facilitate separation of sodium chloride by-product.

Dialkyl ethers of polyalkylene glycols are excellent solvents for removal of acid gases such as carbon dioxide, hydrogen sulfide, sulfur dioxide, etc., from gaseous mixtures. For example, the dimethyl ether of polyethylene glycol is particularly advantageous in the removal of hydrogen sulfide from sour natural gas, in the manner of Kutsher and Smith U.S. Pat. 3,362,133.

The dialkyl ethers of polyalklene glycols are prepared by reacting the monoalkyl ether with sodium to form the sodium alcoholate thereof, which is then reacted with an alkyl chloride to produce the dialkyl ether and sodium chloride. Use of a sodium dispersing agent, such as toluene, xylene and the like, has been necessary heretofore, not only to afford an effective reaction medium, but also to facilitate separation of the by-product sodium chloride. In the absence of toluene or other sodium dispersing agent, the sodium chloride precipitates in an extremely finely divided state and forms a suspension, which can be separated only with great difficulty. When toluene or other sodium dispersing agent is present in the reaction medium, the sodium chloride precipitates in the form of easily filterable crystals. Upon removal of the sodium chloride from the reaction slurry by centrifugation or filtration, the toluene is removed by distillation at atmospheric pressure and is recovered for recycle. The toluene-free dialkyl ether is then purified by distillation at reduced pressure.

However, it is undesirable to use the dispersing agents in the sodium reaction step due to increased process costs arising from the toluene losses and the extra equipment and processing steps needed for toluene addition, removal by distillation, recovery and recycle. In addition, there is a safety hazard. All attempts to avoid the use of toluene or other dispersing agent have been unsatisfactory heretofore, due to the difficulty in separating the sodium chloride.

SUMMARY OF THE INVENTION

In the process for production of dialkyl ethers of polyalkylene glycols by reacting the monoalkyl ether thereof with sodium to form the sodium alcoholate of the monoalkyl ether, and reacting the sodium alcoholate with an alkyl chloride to form the dialkyl ether and sodium chloride by-product, it has been unexpectedly found that incorporating a small amount of water in the reaction medium prior to reacting the sodium alcoholate with alkyl chloride facilitates separaticn of the sodium chloride by-product and avoids the need for toluene or similar dispersing agent. Normally, about 0.1–0.6% water based on the monoalkyl ether is effective.

The dialkyl ether is useful for separating acid gases from gaseous mixtures. The dimethyl ether of polyethylene glycol is especially useful for this purpose and will be described in detail hereinafter.

DETAILED DESCRIPTION OF THE INVENTION

The instant process is an improvement over methods taught by the prior art for production of dialkyl ethers of ethylene glycols from monoalkyl ethers thereof, involving a sodium reaction step, wherein the monoalkyl ether is reacted with sodium, and an alkylation step, wherein the product of the sodium reaction step is further reacted with an alkyl chloride. Incorporation of water in the reaction medium according to the instant invention, must be at a time prior to the alkylation step to effectively facilitate separation of the sodium chloride by-product. The water might be added to the medium between the two steps, i.e. immediately after the sodium reaction step, but it is normally more convenient to incorporate the water initially, prior to the addition of the metallic sodium reagent. About 0.1–0.6 weight percent of water, based on the amount of monoalkyl ether charged, has been found to be effective, with about 0.3–0.5 weight percent preferred.

In the sodium reaction step, metallic sodium is added to the monoalkyl ether, preferably after water has been added to the ether in accordance with the instant invention. Stoichiometric amounts of the reagents will usually be employed, although an excess of either might be used to improve the yield with respect to the other. The reaction can be conducted in a conventional agitated, cooled, batch reactor at a temperature of 100–120° C., preferably 105–115° C. Normally, atmospheric pressure will be employed, although super- or subatmospheric conditions might be employed if desired. Hydrogen gas formed by the reaction of sodium is vented. Reaction time is controlled by the ability to remove heat of reaction, but usually about one hour is required.

Upon completion of the sodium reaction step, water is added to the reactor in the manner of the instant invention (if it had not already been added prior to the sodium reaction step) and then alkyl chloride is added. Approximately a stoichiometric amount of alkyl chloride will be employed, although an excess might be used to increase the yield of product. The reaction is normally conducted at 100–120° C., preferably 105–115° C., and at atmospheric pressure. Formation of the dialkyl ether and sodium chloride proceeds rapidly, with hold-time again being a function of heat removal capacity. The by-product sodium chloride precipitates as small, well-defined crystals which settle rapidly and are easily separated by centrifugation, filtration or similar separation techniques.

The salt-free dialkyl ether may be purified by distillation at reduced pressures of about 5 mm. Hg. The overhead contains the dialkyl ethers of the trialkylene through octaalkylene glycols and is recovered as product.

In conducting the alkylation step, other alkylating agents with similar activity might be used in place of the alkyl chloride, for example, alkyl bromide and the like. Any alkylating agent which affords a readily separable sodium salt upon reaction with the product of the sodium reaction step in the presence of an effective amount of water might be employed in an equivalent manner.

The monomethyl ether of the polyalkylene glycols, from which the dimethyl ether is prepared, is obtained by reacting one mole of methanol with about four moles of alkylene oxide at 100–140° C., preferably 120–130° C. Sodium hydroxide is used as a catalyst in an amount about 0.05–0.2 weight percent based on the reactants charged. Pressure is maintained at about 50–150 p.s.i.g. by regulating the rate of ethylene oxide addition.

The monomethyl ether of polyethylene glycol thus obtained has an average molecular weight of about 208 and is a mixture of the monomethyl ethers of polyethylene glycols containing from one to eight ethylene oxide units. The lower molecular weight compounds may be removed by distillation at about 5 mm. Hg pressure to be recycled to the reaction, or they may be left in the reaction mixture. Preferably, the lower weight compounds will be removed and recycled to afford a monomethyl ether product of tri- through octaethylene glycol, which will be converted to the dimethyl ether according to the instant process.

The dialkyl ethers of polyethylene glycols obtained by the instant process are useful in separating acid gases from gaseous mixtures. For this purpose, the dimethyl ether is preferred. However, the alkyl moieties of the dialkyl ethers might each contain as many as 8 carbon atoms or even more, it only being necessary that the ether be a liquid under normal conditions of the separation process. Also, it is not required that the dialkyl ether be symmetrical, i.e., the two alkyl moieties need not be the same.

In utilizing the instant dialkyl ethers of polyethylene glycols for the separation of acid gases from gaseous mixtures, general procedures known in the art can be employed. For example, to eliminate hydrogen sulfide from sour natural gas containing hydrogen sulfide and methane, a procedure involving the following steps might be employed: contacting the gaseous mixture with the dialkyl ether under conditions to effect absorption of the hydrogen sulfide in the dialkyl ether; stripping the hydrogen sulfide-containing ether with an oxygen-containing gas to partially oxidize residual hydrogen sulfide; and returning the desorbed ether for further absorption. This process is described in detail in aforementioned U.S. 3,362,133.

The following examples are provided to illustrate the invention more fully. They are provided for illustrative purposes only and are not to be construed as limiting the invention, which is defined by the appended claims.

Example I

A stainless steel reactor equipped with agitator, baffles, and jacket was charged with 1000 pounds of a mixture of monomethyl ethers of tri- through octaethylene glycol having average molecular weight of 208. A total of 4.5 pounds of water was added to the reactor, the contents of which were then heated to 110° C. with agitation. A stoichiometric amount of molten metallic sodium at 135–140° C. was slowly added to the reactor at a rate sufficient to maintain reaction temperature at 105–115° C. Regulation of flow of cooling water in the jacket was also employed to maintain the temperature. The hydrogen formed during the reaction was vented.

After the addition of metallic sodium was completed, methyl chloride in 115% of stoichiometric quantity was gradually added to the reactor at a rate sufficient to maintain reactor temperature at 105–115° C. in conjunction with the flow of cooling water in the jacket. Sodium chloride, which precipitated in small, well-defined crystals which settled rapidly, was removed by centrifugation at the rate of 120 pounds per hour per square foot of filter, leaving a salt-free mixture of dimethyl ethers of tri- through octaethylene glycol. The sodium chloride cake appeared dry and flaky and contained 10% mother liquor, representing a dimethyl ether loss of 2.8%.

Example II

The procedure of Example I was repeated wherein no water was added to the reaction medium. The sodium chloride precipitated in an extremely finely divided state and formed a suspension. Centrifugation rate of 10 pounds per hour per square foot of filter was obtained. The resulting sodium chloride cake was pasty and extremely wet with adhered mother liquor. The cake contained 30% mother liquor, representing a dimethyl ether loss of 10.5%.

Example III

Natural gas containing 736 p.p.m. $H_2S$ entered the bottom of a 20-plate absorption column having cross section of 0.754 sq. ft. at a rate of 104.0 standard cubic feet per minute (s.c.f.m.). Dimethyl ethers of polyethylene glycols as obtained in Example I, being recycled in the process and containing about 20 p.p.m. $H_2S$, entered the top of the column at 8.8 gallons/minute. The column was operated at 460 p.s.i.a., with solvent temperature of 48° F. at the inlet and 55° F. at the exit.

The ether was then flashed at 95 p.s.i.a. and at a temperature of about 46° F. The resulting desorbed gas was recycled to the absorption column and the ether was then fed to a 10-plate stripper column having a cross-section of about 1.77 sq. ft. The stripper was operated at 20 mm. Hg (absolute), with ether temperature of about 50° F. Air was added at the rate of 0.30 s.c.f.m. at the bottom of the column to aid in stripping $H_2S$. The $H_2S$ concentration in the ether was reduced to about 20 p.p.m., and the ether was then cooled to 48° F. and recycled to the absorber.

The $H_2S$-air mixture (containing 0.02 s.c.f.m. of $H_2S$) from the stripper was mixed with 0.08 s.c.f.m. of air, preheated to 500° F., and was then fed to a reactor containing 4.8 mesh Porocel catalyst (an activated bauxite with low iron content) operating at 550° F. The sulfur and water vapors from the reactor were passed to a condenser operating at about 250° F. The sulfur was condensed and left the bottom of the condenser at 250° F. The water vapor and air were vented to the atmosphere. Yield of elemental sulfur was about 92% of theory based on $H_2S$ in the natural gas.

What is claimed is:

1. In the process for the preparation of a dialkyl ether of a polyethylene glycol having 1–8 carbon atoms in each alkyl group and 3–8 ethylene units, from the monoalkyl ether thereof by reacting the monoalkyl ether with sodium at a temperature of about 100–120° C. to form the sodium alcoholate thereof, reacting the sodium alcoholate with an alkyl chloride containing 1–8 carbon atoms at a temperature of about 100–120° C. to form the dialkyl ether and sodium chloride, and separating the sodium chloride from the dialkyl ether, the improvement which comprises: incorporating about 0.3–0.6 weight percent of water, based on the monoalkyl ether, in the reaction medium prior to reacting the sodium alcoholate with alkyl chloride.

2. The improvement of claim 1 wherein said water is incorporated in the reaction medium prior to reacting the monoalkyl ether with sodium.

3. The improvement of claim 2 wherein the amount of water incorporated is about 0.3–0.5 weight percent, based on the monoalkyl ether.

4. A process for the preparation of a dimethyl ether of a polyethylene glycol having from 3 to 8 ethylene units from the monomethyl ether thereof which comprises:
  (a) incorporating about 0.3–0.6 weight percent of water in said monomethyl ether;
  (b) adding metallic sodium to the water-containing monomethyl ether while maintaining the temperature thereof within the range of about 100–120° C., to form the sodium alcoholate of said monomethyl ether;
  (c) adding methyl chloride to the sodium alcoholate-containing mixture while maintaining the temperature within the range of about 100–120° C. to form the dimethyl ether and crystalline sodium chloride; and (d) separating the crystalline sodium chloride therefrom.

5. The process as claimed in claim 4 wherein the amount of water incorporated in step (a) is about 0.3–0.5 weight percent, based on the monomethyl ether.

6. The process as claimed in claim 4 wherein the amount of water incorporated in step (a) is about 0.45 weight percent, based on the monomethyl ether.

References Cited

UNITED STATES PATENTS

| | | | |
|---|---|---|---|
| 2,111,234 | 3/1938 | Zellhoefer | 26—615B |
| 2,271,873 | 2/1942 | Perkins et al. | 260—615B |
| 2,575,298 | 11/1951 | Ryznar | 260—615BUX |
| 2,615,853 | 10/1952 | Kirkpatrick et al. | 260—615BUX |
| 2,662,859 | 12/1953 | Kirkpatrick | 260—615BX |
| 2,782,240 | 2/1957 | Hefner et al. | 260—615BX |
| 2,951,094 | 8/1960 | Hefner et al. | 260—615B |

HOWARD T. MARS, Primary Examiner

U.S. Cl. X.R.

55—44